United States Patent
Roberts et al.

(10) Patent No.: US 10,289,413 B2
(45) Date of Patent: May 14, 2019

(54) HYBRID ANALOG-DIGITAL FLOATING POINT NUMBER REPRESENTATION AND ARITHMETIC

(71) Applicant: Advanced Micro Devices, Inc., Santa Clara, CA (US)

(72) Inventors: David A. Roberts, Wellesley, MA (US); Elliot H. Mednick, Salem, NH (US); David John Cownie, Concord, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/843,965

(22) Filed: Dec. 15, 2017

(65) Prior Publication Data
US 2019/0102175 A1    Apr. 4, 2019

Related U.S. Application Data

(60) Provisional application No. 62/567,149, filed on Oct. 2, 2017.

(51) Int. Cl.
*G06F 9/30*      (2018.01)
*G06F 7/483*      (2006.01)

(52) U.S. Cl.
CPC .......... *G06F 9/30014* (2013.01); *G06F 7/483* (2013.01); *G06F 9/3013* (2013.01);
(Continued)

(58) Field of Classification Search
CPC .............. G06F 9/30014; G06F 9/3013; G06F 9/30025; G06F 9/30112; G06F 9/30101; G06F 7/483; G06F 2207/483
See application file for complete search history.

(56) References Cited

U.S. PATENT DOCUMENTS

| 5,375,081 A | 12/1994 | Anderson |
| 2012/0262597 A1* | 10/2012 | Frantz ................ H04N 5/23229 348/222.1 |
| 2016/0179467 A1* | 6/2016 | Bates .................... G06F 7/4833 708/503 |

OTHER PUBLICATIONS

Yipeng Huang, Ning Guo, Mingoo Seok, Yannis Tsividis, Kyle Mandli, Simha Sethumadhavan; "Hybrid Analog-Digital Solution of Nonlinear Partial Differential Equations"; Micro-50; Oct. 14-18, 2017; Cambridge, MA; United States; 14 pages.

(Continued)

*Primary Examiner* — Matthew D Sandifer
(74) *Attorney, Agent, or Firm* — Polansky & Associates, P.L.L.C.; Paul J. Polansky

(57) ABSTRACT

A hybrid floating-point arithmetic processor includes a scheduler, a hybrid register file, and a hybrid arithmetic operation circuit. The scheduler has an input for receiving floating-point instructions, and an output for providing decoded register numbers in response to the floating-point instructions. The hybrid register file is coupled to the scheduler and contains circuitry for storing a plurality of floating-point numbers each represented by a digital sign bit, a digital exponent, and an analog mantissa. The hybrid register file has an output for providing selected ones of the plurality of floating-point numbers in response to the decoded register numbers. The hybrid arithmetic operation circuit is coupled to the scheduler and to the hybrid register file, for performing a hybrid arithmetic operation between two floating-point numbers selected by the scheduler and providing a hybrid result represented by a result digital sign bit, a result digital exponent, and a result analog mantissa.

20 Claims, 5 Drawing Sheets

(52) U.S. Cl.
CPC ...... *G06F 9/30025* (2013.01); *G06F 9/30101* (2013.01); *G06F 9/30112* (2013.01); *G06F 2207/483* (2013.01)

(56) References Cited

OTHER PUBLICATIONS

Jay P. Sage, Richard S. Withers, Karl E. Thompson; "MNOS/CCD Circuits for Neural Network Implementations"; 1989 International Symposium on Circuits and Systems; May 8-11, 1989; Portland, OR; United States; 3 pages.

Yipeng Huang and Ning Guo, "Back to Analog Computing: Columbia Researchers Merge Analog and Digital Computing on a Single Chip"; Columbia University, posted at https://www.cs.columbia.edu/2016/back-to-analog-computing-columbia-researchers-merge-analog-and-digital-computing-on-a-single-chip/; Nov. 22, 2016; New York, NY; United States; 14 pages.

\* cited by examiner

… (US 10,289,413 B2)

HYBRID ANALOG-DIGITAL FLOATING POINT NUMBER REPRESENTATION AND ARITHMETIC

BACKGROUND

In computer technology, numbers can be represented in a variety of formats including signed and unsigned integer, Boolean, and floating point. Floating point numbers are useful in certain computations such as graphics data, scientific data, and the like. In general, a floating point number can be represented as $F=M \cdot B^E$, in which M is the mantissa or significand, E is the exponent, and B is the base. M is usually normalized, where there are no leading zeros in the significand, which maintains the best accuracy. Expressing a floating point number in this format also simplifies comparisons between floating point numbers because their exponents can be compared. However arithmetic computations between two digital floating point numbers often consume significant power and their sizes can also require the instructions to be processed in steps in separate pipeline stages, increasing processing time.

Figure 1:
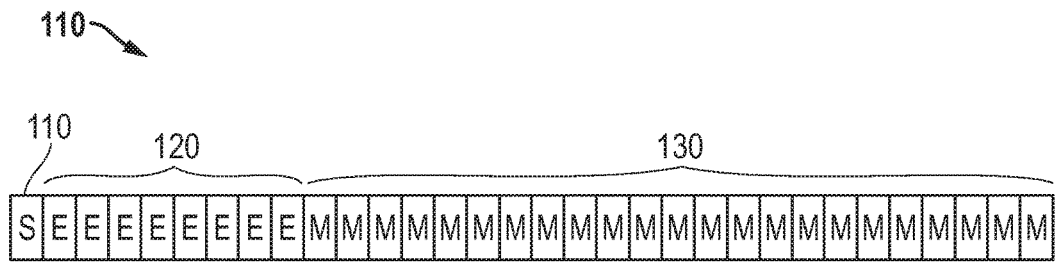
FIG. 1 illustrates a conceptual diagram of a representation of a floating-point number known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well. Additionally, the terms remap and migrate, and variations thereof, are utilized interchangeably as a descriptive term for relocating.

DETAILED DESCRIPTION OF ILLUSTRATIVE EMBODIMENTS

As will be described in detail below, in one form a hybrid floating-point arithmetic processor includes a scheduler, a hybrid register file, and a hybrid arithmetic operation circuit. The scheduler has an input for receiving floating-point instructions, and an output for providing decoded register numbers in response to the floating-point instructions. The hybrid register file is coupled to the scheduler and contains circuitry for storing a plurality of floating-point numbers each represented by a digital sign bit, a digital exponent, and an analog mantissa. The hybrid register file has an output for providing selected ones of the plurality of floating-point numbers in response to the decoded register numbers. The hybrid arithmetic operation circuit is coupled to the scheduler and to the hybrid register file, for performing a hybrid arithmetic operation between two floating-point numbers selected by the scheduler and providing a hybrid result represented by a result digital sign bit, a result digital exponent, and a result analog mantissa.

In another form, a hybrid floating-point arithmetic processor includes a hybrid arithmetic operation circuit, the hybrid arithmetic operation circuit including a digital sign and exponent logic circuit, and an analog mantissa logic circuit. The digital sign and exponent logic circuit has a first input for receiving a first digital sign bit of a first operand, a second input for receiving a second digital sign bit of a second operand, a third input for receiving a first digital exponent of the first operand, a fourth input for receiving a second digital exponent of a second operand, a first output for providing a result digital sign bit, and a second output for providing a result digital exponent. The analog mantissa logic circuit has a first input for receiving a first analog mantissa of the first operand, a second input for receiving a second analog mantissa of the second operand, and an output for providing a result analog mantissa, wherein the analog mantissa logic circuit performs a predetermined arithmetic operation between the first and second analog mantissas.

In yet another form, a method includes receiving a floating point instruction. The floating point instruction is decoded to provide first and second decoded register numbers. A first hybrid operand is fetched from a hybrid register file in response to the decoded register number, wherein the first hybrid operand includes a first digital portion and a first analog portion. A second hybrid operand is fetched from the hybrid register file in response to the second decoded register number, wherein the first hybrid operand includes a second digital portion and a second analog portion. A hybrid arithmetic operation is performed on the first and second hybrid operands in a hybrid arithmetic operation circuit to provide a hybrid result. The hybrid result is stored in the hybrid register file.

FIG. 1 illustrates a conceptual diagram of a representation of a floating-point number 100 known in the prior art. In the example shown in FIG. 1, floating-point number 100 uses a 32-bit single precision floating point number defined by the IEEE 754-2008 standard published by the Institute of Electrical and Electronics Engineers. Floating-point number 100 includes 32-bits in which the more significant bits are on the left and the less significant bits are on the right. Floating-point number 100 includes a sign bit field 110, an exponent field 120, and a mantissa field 130. Sign bit field 110 is in bit position 31 and includes a single sign bit labeled "S". Exponent field 120 is in bit positions 30-23 and includes eight exponent bits each labeled "E". Mantissa field 130 is a 23-bit field in bit positions 22-0 and includes twenty-three mantissa bits each labeled "M".

The IEEE 754-2008 standard defines three different floating-point formats. The hybrid floating point unit disclosed below can accommodate these and other floating-point formats as well.

Figure 2:
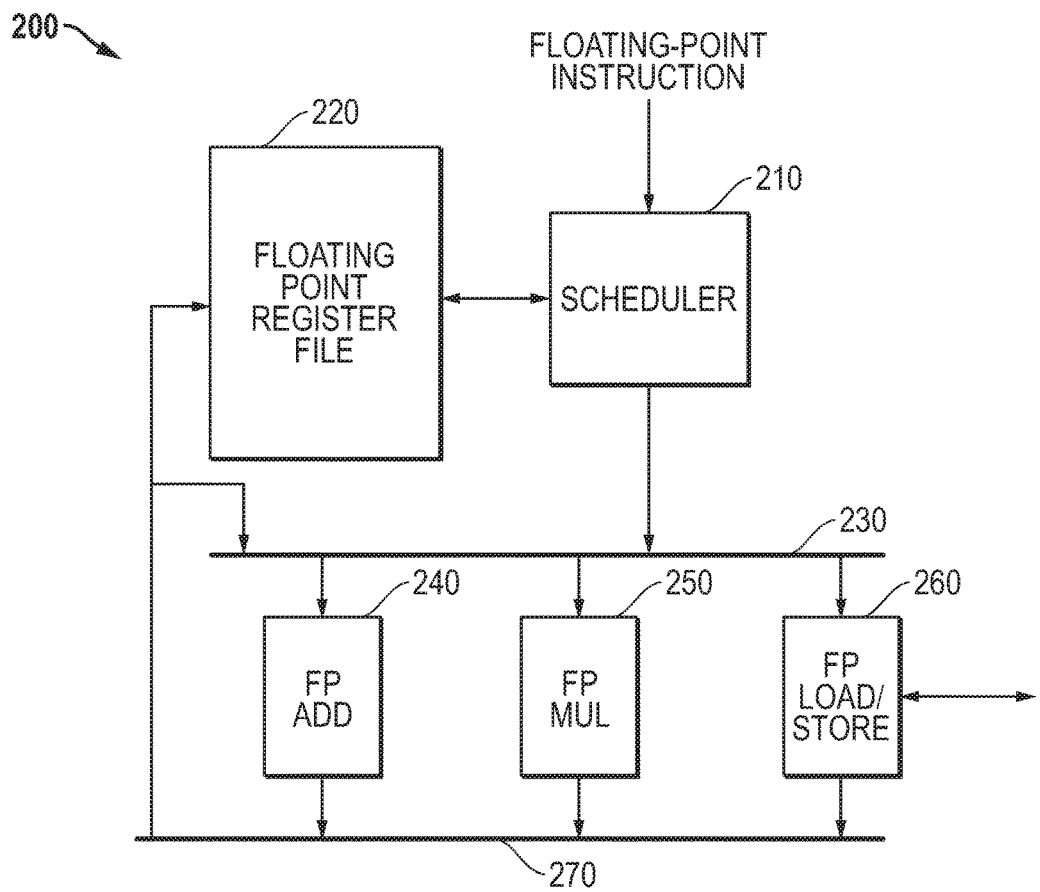
FIG. 2 illustrates in block diagram form a floating-point unit known in the prior art capable of performing arithmetic operations using floating-point numbers in the format shown in FIG. 1.

FIG. 2 illustrates in block diagram form a floating-point unit 200 known in the prior art capable of performing arithmetic operations using floating-point numbers in the format shown in FIG. 1. Floating-point unit 200 includes a scheduler 210, a floating-point register file 220, an operand bus 230, a floating-point adder 240, a floating-point multiplier 250, and a floating-point load/store unit 260. Scheduler 210 has an input for receiving floating-point instructions, a bidirectional connection for conducting operands, and an output connected to operand bus 230. Floating-point register file 220 has an input and a bidirectional connection to scheduler 210. Operand bus 230 is a wide internal bus connected to the output of scheduler 210 for conducting operands and instruction control signals to the various operational units in floating-point unit 200. Floating-point adder 240 has an input connected to operand bus 230, and an output. Floating-point multiplier 250 has an input connected to operand bus 230, and an output. Floating-point load/store unit 260 has an input connected to operand bus 230, a bidirectional connection to a memory system (not shown in FIG. 2), and an output. Result bus 270 is a wide internal bus connected to the outputs of the various operational units in floating-point unit 200 including floating-point adder 240, floating-point multiplier 250, and floating-point load/store unit 260, is connected to the input of floating-point register file 220, and has a bypass path connected to operand bus 230.

Because floating-point unit 200 operates on wide operands, such as IEEE 754 single precision, double-precision, and extended-precision numbers, it is necessarily large and consumes a significant amount of power. Each of operand bus 230 and result bus 270 includes a large number of conductors. Some known floating-point units support all of the IEEE formats and thus have to be designed for 80-bit extended precision format even though it can operate on the smaller formats. Floating-point adder 240 operates on two floating-point numbers and is typically implemented using a multi-stage adder tree that calculates sums and then propagates carries. Floating-point multiplier 250 is even more complex, and is typically implemented using Booth's algorithm having recoders for overlapping sets of bits and a large adder tree for summing partial products. In order to perform addition, floating-point adder 240 needs to normalize the operands so that they have the same exponents, and then re-normalize the sum. Likewise floating-point multiplier 250 normalizes the product before storing it in floating-point register file 220. An exemplary multiplier that illustrates the complexity will now be described.

Figure 3:
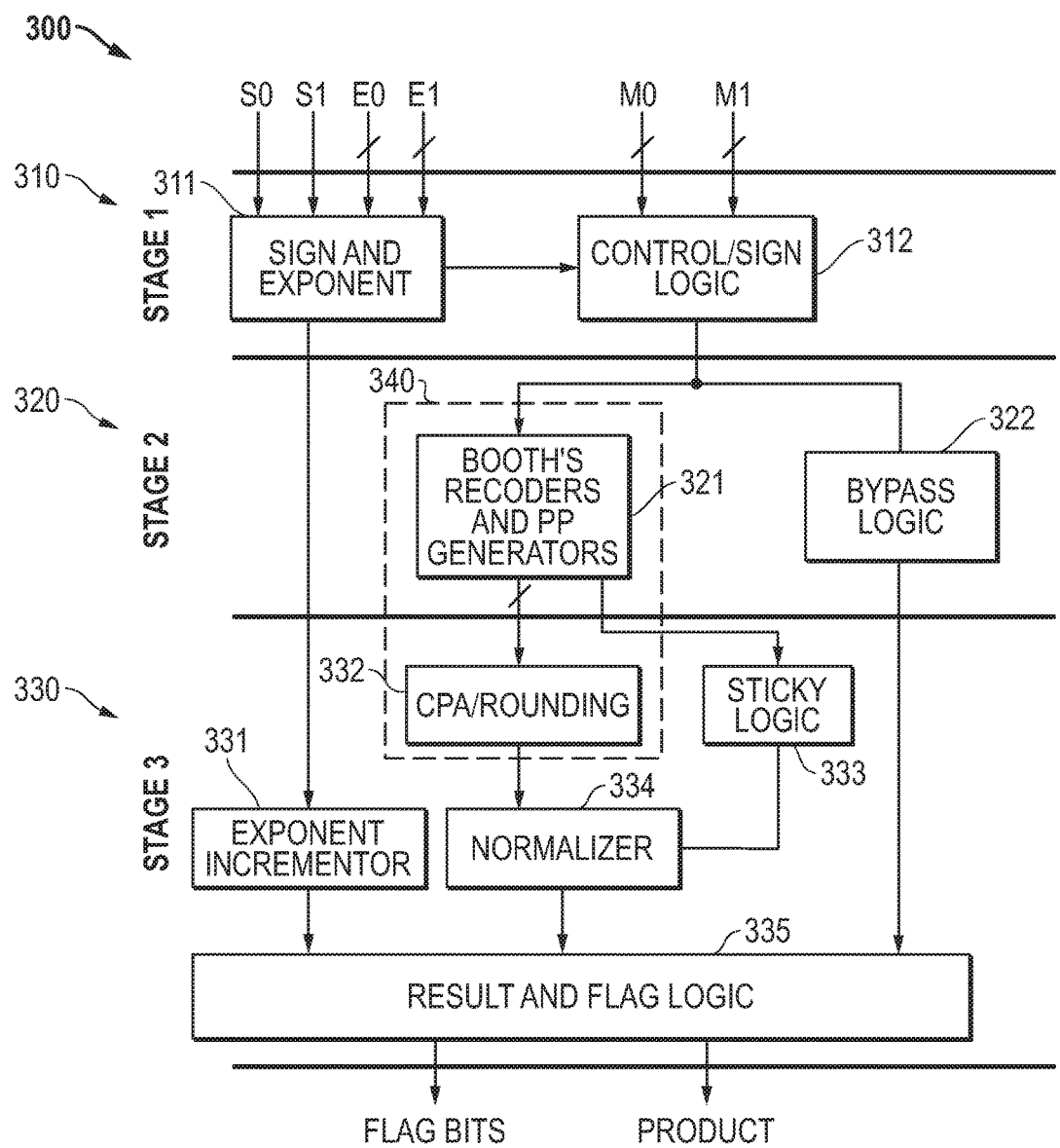
FIG. 3 illustrates in block diagram form a floating point multiplier known in the prior art suitable for use in the floating-point unit of FIG. 2.

FIG. 3 illustrates in block diagram form a floating-point multiplier 300 known in the prior art suitable for use in floating-point unit 200 of FIG. 2. Floating-point multiplier 300 includes circuitry organized into three pipeline stages 310, 320, and 330 labeled "STAGE 1", "STAGE 2", and "STAGE 3", respectively.

STAGE 1 includes a sign and exponent circuit 311 and a control and sign logic circuit 312. In floating-point multiplier 300, each floating point number is represented by a sign bit, an exponent, and a mantissa. Thus a first operand can be represented as S0:E0:M0 and a second operand can be represented as S1:E1:M1. Sign and exponent circuit 311 has inputs for receiving sign bits S0 and S1 and exponent fields E0 and E1, a first output, and a second output. Control and sign logic circuit 312 has inputs for receiving mantissas M0 and M1, a control input connected to the first output of sign and exponent circuit 311, and an output.

STAGE 2 includes Booth's recoders and partial product generators 321 and a bypass logic circuit 322. Booth's recoders and partial product generators 321 have an input connected to the output of control and sign logic circuit 312, and first and second outputs. Bypass logic circuit 322 has an input connected to the output of control and sign logic circuit 312, and an output.

STAGE 3 includes an exponent incrementor 331, a carry propagate adder (CPA) and rounding circuit 332, a sticky bit logic circuit 333, a normalizer 334, and a result and flag logic circuit 335. Exponent incrementor 331 has a first input connected to the output of sign and exponent circuit 311, a second input, and an output. CPA and rounding circuit 332 has an input connected to the output of Booth's recoders and partial product generators 321, and an output. Sticky bit logic circuit 333 has an input connected to the second output of Booth's recoders and partial product generators 321, and an output. Normalizer 334 has a first input connected to the output of CPA and rounding circuit 332, a second input connected to the output of Sticky bit logic circuit 333, a first output connected to the second input of exponent incrementor 331, and a second output. Result and flag logic circuit 335 has a first input connected to the output of exponent incrementor 331, a second input connected to the second output of normalizer 334, a third input connected to the output of bypass logic circuit 322, a first output for providing a set of flag bits labeled "FLAG BITS", and a second output for providing a product labeled "PRODUCT".

A multiplier circuit 340 is formed by Booth's recoders and partial product generators 321 in STAGE 2 and CPA and rounding circuit 332 in STAGE 3.

In operation, floating-point multiplier 300 is a 3-stage pipelined multiplier that performs floating-point multiplication on two floating-point input numbers to provide a product and a set of flag bits representative of the result of the multiplication. The product includes a sign bit field, an exponent field, and a mantissa field in the same format as the input floating-point numbers. In general when multiplying two floating-point numbers, the exponents are added and the mantissas are multiplied together. The sign of the result depends on the signs of the inputs, in which the product of two numbers of like type (both positive or both negative) is a positive number and the product of two numbers of unlike type (one positive and the other negative) is a negative number.

Multiplier circuit 340 is a large circuit and Booth's recoders in Booth's recoders and partial product generators 321 typically recode overlapping groups of three bits to provide partial products. CPA and rounding circuit 332 performs carry propagation and final addition. The size and complexity of multiplier circuit 340 requires it to be broken into two pipeline stages since it would be impossible to form a product in a single pipeline stage for some numbers.

For some applications, such as graphics processing and machine learning, exact numerical precision is not required and the computations can be carried out using analog computation. Moreover, floating-point computations can use a hybrid approach in which the computations which are relatively simple—sign and exponent logic—can be carried out digitally while the computations which are complex—mantissa addition and multiplication—can be carried out using analog processing. Such a hybrid multiplier preserves the benefits of both approaches but reduces the overall size and power consumption significantly.

Analog computations can be more energy efficient than digital computation in some cases, although they may be more prone to noise and errors. Because floating-point numbers consist of two separate components (mantissa and exponent), hybrid number storage and computation may be applied differently to the two parts in order to reduce the magnitude of errors caused by faults. By providing hybrid computing, the energy efficiency of error-tolerant processing algorithms such as Neural Network processing used in graphics processing units (GPUs) can be improved.

According to some embodiments, a data processing system represents a number in a hybrid analog-digital floating point number representation where the mantissa is analog and the exponent is digital.

According to some embodiments, various arithmetic circuits are provided for processing such hybrid values. A data processing system, data processor, and arithmetic circuits use the hybrid values to improve their performance-per-watt efficiency.

In these various embodiments, the mantissa is stored and manipulated in analog form, while the exponent is stored and processed digitally. The motivation is that errors in the mantissa have much less impact (by orders of magnitude) than errors in the exponent, which makes the mantissa more error tolerant. This characteristic allows exploitation of some of the energy advantage of analog arithmetic.

Arithmetic Circuits for Hybrid Floating-Point Numbers

In general when using the hybrid format, the system designer should prefer to operate on the exponent digitally and mantissa entirely in analog form, until it needs to exit the execution pipeline for use in other digital circuits or for storage in digital memory. This saves energy and reduces delay. The following function implementations apply these principles:

1. Comparison
   a. For Normalized values, first compare the exponents. Only need to compare mantissa if the exponents are different. Therefore a digital comparator can first compare exponents. An output multiplexer then either forwards the digital compare result, or invokes an analog comparator on the mantissa.
   b. For non-Normalized parameters and potentially greater energy savings, perform the entire comparison in the analog domain. First, perform digital-to-analog conversion on the exponent, with an exponential gain function. Then linearly multiply this by the mantissa. Do this for both operands and then perform the analog comparison.
2. Multiplication: Digitally add the exponents, analog multiply the mantissa. Optionally normalize.
3. Addition/Subtraction: Divide the number with the smallest mantissa by $B^{(E1-E2)}$ where E1 is the larger of the two, and the new Exponent E=(E1−E2). Then add the two mantissas. In the hybrid representation, first, E1−E2 would be calculated digitally. Then since base B=2, an analog divider circuit (amplifier) with input (E1−E2) would select from one of several 1/(power-of-2) Gain settings, in order to scale down the mantissa. The two mantissa can then be added by an analog adder. Normalization can optionally be applied at this stage.
4. Normalization: To directly perform some operations such as Comparison in Hybrid form, Normalization is needed. An Analog Normalizer works by amplifying the mantissa by a factor <1.0. An ADC with exponential ranging can identify the scaling factor required to return the value <1.0. This value is digitally subtracted from the exponent, and is a parameter to an analog multiplier which scales down the mantissa. In some cases, energy might be saved in digital or analog floating-point systems by delaying the normalization step. For example, instead of normalizing as part of every arithmetic operation, it is possible to perform a normalization after every N operations. This delayed normalization sacrifices some accuracy for reduced latency and energy consumption overall.

Exemplary Hybrid Floating-Point Arithmetic Processor

Figure 4:
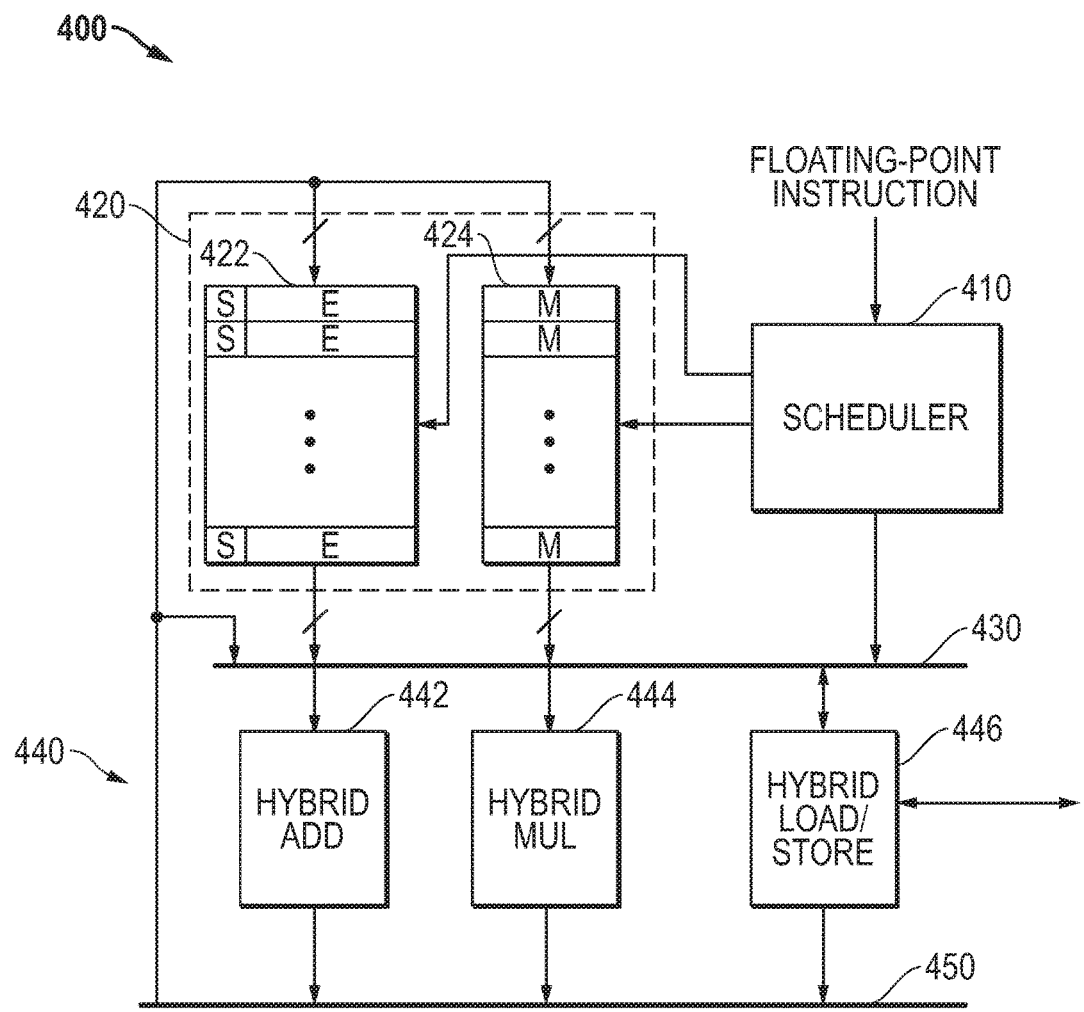
FIG. 4 illustrates in block diagram form a hybrid floating-point arithmetic processor according to some embodiments.

FIG. 4 illustrates in block diagram form a hybrid floating-point arithmetic processor 400 according to some embodiments. Hybrid floating-point arithmetic processor 400 includes a scheduler 410, a hybrid register file 420, an operand bus 430, a hybrid arithmetic operation circuit 440, and a result bus 450. Scheduler 410 has an input for receiving floating-point instructions, a bidirectional digital connection for conducting a digital portion of floating-point operands, a bidirectional analog connection for conducting an analog portion of floating-point operands, and a hybrid output connected to operand bus 430.

Hybrid register file 420 includes a digital register file 422 and an analog register file 424. Digital register file 422 has a digital input, a bidirectional digital connection corresponding to the bidirectional digital connection of scheduler 410, and a digital output. Each entry in digital register file 422 has a sign bit field and an exponent field. For example, the sign bit field could include a single bit and the exponent field eight bits corresponding to IEEE-754 single precision values. Analog register file 424 has an analog input, a bidirectional digital connection corresponding to the bidirectional analog connection of scheduler 410, and an analog output. Each entry in analog register file 424 stores an analog mantissa corresponding to a sign bit field and exponent in digital register file 422.

Operand bus 430 is a wide internal bus connected to the output of scheduler 410 for conducting operands (digital sign bit field, and digital exponent, and corresponding analog mantissa) and digital instruction control signals to the various operational units in hybrid floating-point arithmetic processor 400.

Hybrid arithmetic operation circuit 440 includes a hybrid adder 442, a hybrid multiplier 444, and a hybrid load/store unit 446. Hybrid adder 442 has an input connected to operand bus 430, and an output. Hybrid multiplier 450 has an input connected to operand bus 430, and an output. Hybrid load/store unit 446 has an input connected to operand bus 430, a bidirectional connection to a memory system (not shown in FIG. 4), and an output.

Result bus 450 is a wide internal bus connected to the outputs of the various operational units in hybrid arithmetic operation circuit 440 including hybrid adder 442, hybrid multiplier 444, and hybrid load/store unit 446, and is connected to the analog and digital inputs of hybrid register file 420 and has a bypass path connected to operand bus 430.

In operation, hybrid floating-point arithmetic processor 400 provides simplified operations on hybrid floating-point numbers by performing digital operations on the sign bit and exponents but analog operations on mantissas. Hybrid register file 420 includes digital register file 422 for storing the sign bit fields and exponents, and analog register file 424 for storing the analog mantissas. Analog register file 424 can assume a variety of formats to store the analog values. In one form, analog register file 424 stores charge packets similar to a charge coupled device in which the amount of charge in the charge packets represent the values of the mantissas. In another form, analog register file 424 stores digital values that are converted into analog values for efficient arithmetic processing, and reconverted into digital values for efficient storage. This embodiment, which will be described in detail below, provides most of the benefit of hybrid processing but maintains digital storage of mantissas. Each of hybrid adder 442, hybrid multiplier 444, and hybrid load/store unit 446 performs hybrid processing in which the sign and exponent processing is done digitally, and the mantissa processing is done in the analog domain. Examples of a hybrid adder and hybrid multiplier will now be described.

Figure 5:
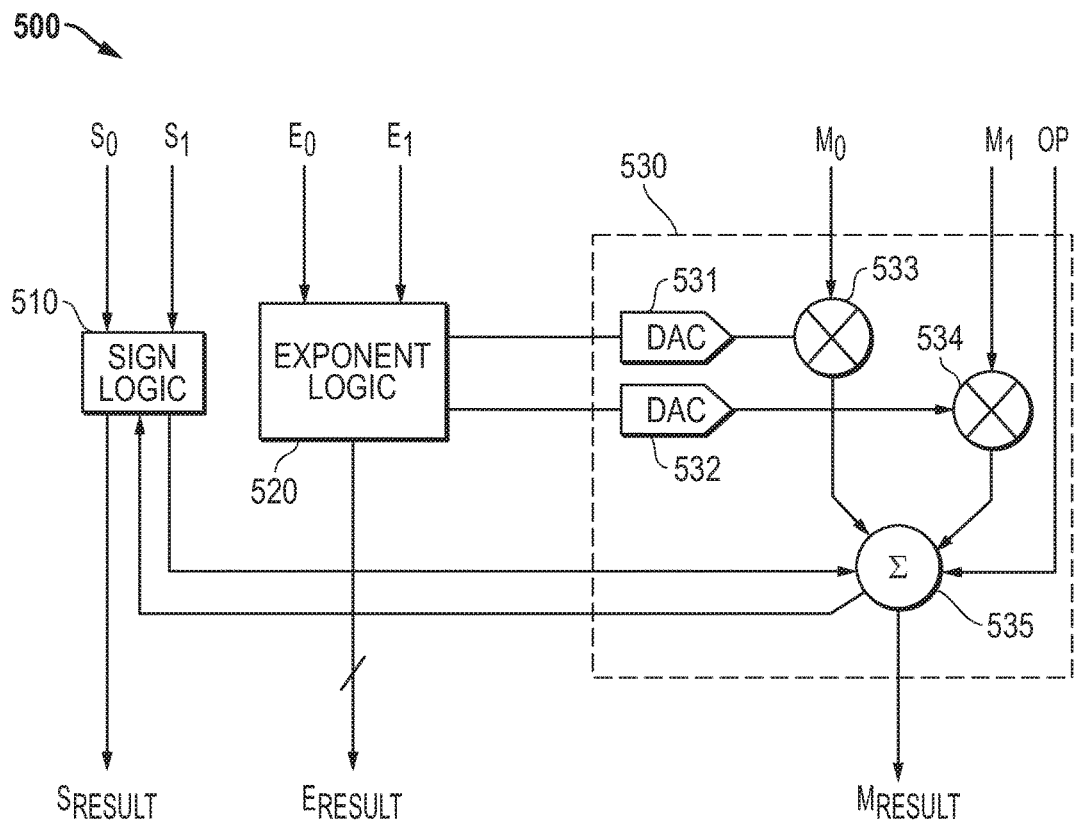
FIG. 5 illustrates in block diagram form a hybrid adder suitable for use in the hybrid floating-point arithmetic processor of FIG. 4 according to some embodiments.

FIG. 5 illustrates in block diagram form a hybrid adder 500 suitable for use in the hybrid floating-point arithmetic processor 400 of FIG. 4 according to some embodiments. Hybrid adder 500 includes a sign logic circuit 510, an exponent logic circuit 520, and an analog adder 530. Sign logic circuit 510 is a digital circuit having a first input for receiving a sign bit of a first operand $S_0$, a second input for receiving a sign bit of a second operand $S_1$, a third input, a first output for providing a result sign bit labeled "$S_{RESULT}$", and a second output. Exponent logic circuit 520 is a digital circuit having first input for receiving an exponent of the first operand $E_0$, a second input for receiving an exponent of the second operand labeled $E_1$, an output for providing the result exponent bit labeled "$E_{RESULT}$", a first control signal output, and a second control signal output. Analog adder 530 includes a digital-to-analog converter (DAC) 531, a DAC 532, a multiplier 533, a multiplier 534, and an analog adder 535. DAC 531 has an input connected to the first control output of exponent logic circuit 520, and an output. DAC 532 has an input connected to the second control output of exponent logic circuit 520, and an output. Multiplier 533 is an analog multiplier having a first input for receiving a mantissa of the first operand $M_0$, a second input connected to the output of DAC 531, and an output. Multiplier 534 is an analog multiplier having a first input for receiving a mantissa of the second operand $M_1$, a second input connected to the output of DAC 532, and an output. Analog adder 535 has a first input connected to the output of analog multiplier 533, a second input connected to the output of multiplier 534, a first control input connected to the second output of sign logic circuit 510, a second control input for receiving an operation type signal labeled "OP" from scheduler 410, a first output for providing a mantissa of a result labeled "$M_{RESULT}$", and a second output connected to the third input of sign logic circuit 510.

In operation, sign logic circuit 510 provides $S_{RESULT}$ in response to $S_0$ and $S_1$, the type of operation (addition or subtraction), and the relative sizes of the mantissas. If $S_0$ and $S_1$ have the same sign bits and the operation type corresponds to the sign bits, then $S_{RESULT}$ is the same as $S_0$ and $S_1$. If any of $S_0$, $S_1$, and the type of operation are different, then the larger of the two mantissas and the type of operation (addition or subtraction) determines $S_{RESULT}$. Exponent logic circuit 520 provides $E_{RESULT}$ as the larger of $E_0$ and $E_1$. At the same time, exponent logic circuit 520 provides a digital adjustment signal to scale the mantissa of the number with the smaller exponent. Thus it provides one of its two control signals with a value of one, and the other of its two control signals with a factor less than one to cause the result to be scaled accordingly. Alternatively, the mantissa corresponding to the larger exponent may merely bypass its respective multiplier. The second output of sign logic circuit 510 is used to determine whether the mantissas are added or subtracted by analog adder 535. Analog adder 535 provides $M_{RESULT}$ in response to adding or subtracting the two scaled mantissas as indicated by the operation type, and also provides the second output based on the operation type and a comparison of the sizes of the two mantissas.

Figure 6:
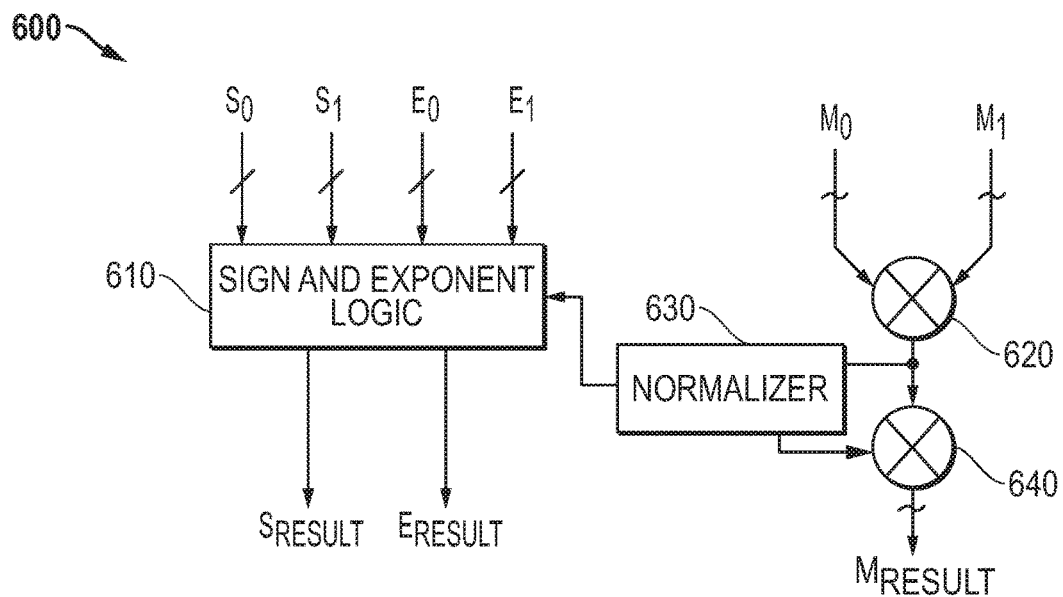
FIG. 6 illustrates in block diagram form a hybrid multiplier suitable for use in the hybrid floating-point arithmetic processor of FIG. 4 according to some embodiments.

FIG. 6 illustrates in block diagram form a hybrid multiplier 600 suitable for use in the hybrid floating-point arithmetic processor of FIG. 4 according to some embodiments. Hybrid multiplier 600 includes a sign and exponent logic circuit 610, an analog multiplier 620, a normalizer circuit 630, and an analog multiplier 640. Sign and exponent logic circuit 610 has inputs for receiving sign bits $S_0$ and and $S_1$ and exponent fields $E_0$ and $E_1$, a control input, a first output for providing $S_{RESULT}$, and a second output for providing $E_{RESULT}$. Analog multiplier 620 has a first input for receiving $M_0$, a second input for receiving $M_1$, and an output. Normalizer 630 has an input connected to the output of analog multiplier 620, a first output connected to the control input of sign and exponent logic circuit 610, and a second output. Analog multiplier 640 has a first input connected to the output of analog multiplier 620, a second input connected to the output of normalizer circuit 630, and an output for providing $M_{RESULT}$.

In operation, sign and exponent logic circuit 610 provides $S_{RESULT}$ in response to $S_0$ and $S_1$. If $S_0$ and $S_1$ are the same, then sign and exponent logic circuit 610 provides $S_{RESULT}$ to indicate a positive sign. If $S_0$ and $S_1$ are different, then sign and exponent logic circuit 610 provides $S_{RESULT}$ to indicate a negative sign. $E_{RESULT}$ is formed by adding $E_0$ and $E_1$, and possibly adjusted further according to the results of the multiplication indicated by normalizer circuit 630. Analog multiplier 620 multiplies $M_0$ and $M_1$ using any of a variety of known analog techniques. If normalizer circuit 630 detects that the output of analog multiplier 620 is less than a certain amount, then it decrements the exponent while also scaling the output of analog multiplier 620 accordingly using analog multiplier 640.

The size and power consumption of hybrid multiplier 600 is significantly less than that of floating-point multiplier 300 of FIG. 3. Hybrid multiplier 600 accomplishes this result by performing sign and exponent computation in the digital domain, while performing mantissa multiplication in the analog domain. Any imprecision in the computation will be reflected only in the mantissa, and this imprecision can be tolerated in certain applications such as neural networks, machine learning, graphics processing, and the like.

Figure 7:
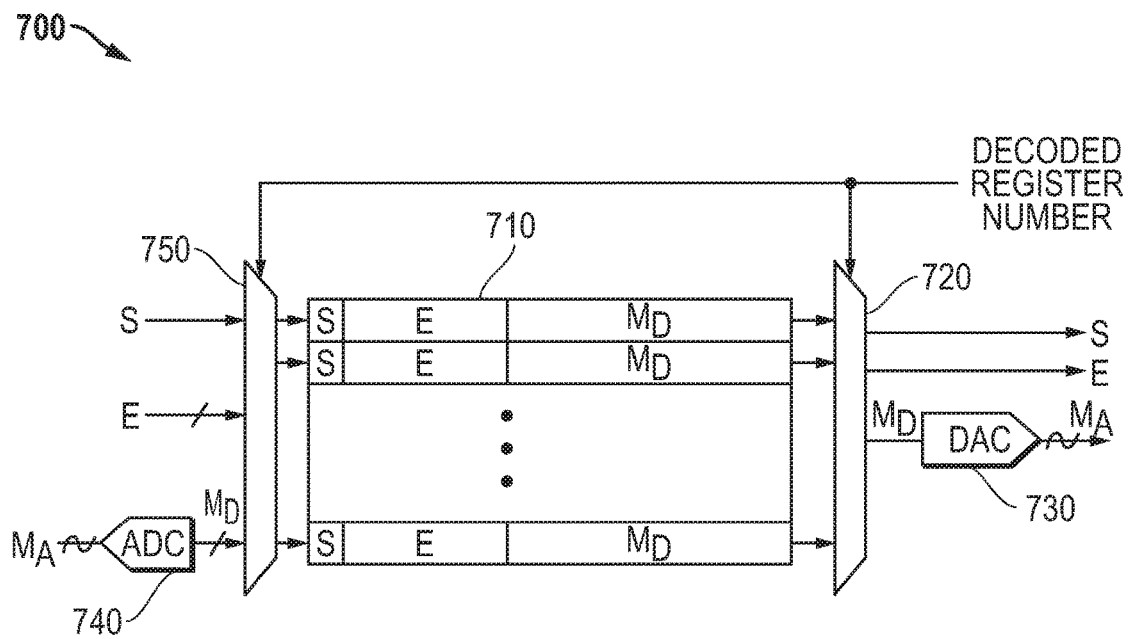
FIG. 7 illustrates in block diagram form a hybrid register file suitable for use in the hybrid floating-point arithmetic processor of FIG. 4 according to some embodiments.

FIG. 7 illustrates in block diagram form a hybrid register file 700 suitable for use in the hybrid floating-point arithmetic processor of FIG. 4 according to some embodiments. Hybrid register file 700 includes generally a digital register file 710, an output selector 720, a DAC 730, an analog-to-digital converter 740, and an input selector 750. Digital register file 710 includes a set of N entries each including a sign bit field S, an exponent field E, and a digital mantissa labeled "$M_D$". Output selector 720 is a multiplexer having a set of N inputs connected to respective entries in digital register file 710, a control input for receiving a signal labeled "DECODED REGISTER NUMBER" from scheduler 410, and outputs for providing a sign bit S, an exponent E, and a mantissa $M_D$ of a selected one of the N entries of digital register file 710. DAC 730 has an input for receiving $M_D$, and an output for providing an analog mantissa labeled "$M_A$". ADC 740 has an input for receiving an analog mantissa $M_A$, and an output for providing $M_D$. Input selector 750 is a de-multiplexer having inputs for receiving sign bit S, exponent E, and $M_D$ from the output of ADC 740, a control input for receiving the DECODED REGISTER NUMBER, and a set of N outputs connected to respective entries in digital register file 710.

Hybrid register file 700 stores each field digitally in digital register file 710, but converts the mantissas to and from the analog domain when they are required for an operation. Thus, hybrid register file 700 avoids the need for certain analog circuits such as charge coupled devices to store analog mantissas that may be difficult to implement in the existing digital semiconductor manufacturing process. The precision of the result is limited by the precision of DAC 730 and ADC 740 but in many applications DAC 730 and ADC 740 can be built with suitable precision to preserve the benefits of hybrid operation.

Hybrid floating-point arithmetic processor 400 or any portions thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. Accordingly, it is intended by the appended claims to cover all modifications of the disclosed embodiments that fall within the scope of the disclosed embodiments.

What is claimed is:

1. A hybrid floating-point arithmetic processor, comprising:
    a scheduler having an input for receiving floating-point instructions, and an output for providing decoded register numbers in response to said floating-point instructions;
    a hybrid register file coupled to said scheduler and containing circuitry for storing a plurality of floating-point numbers each represented by a digital sign bit, a digital exponent, and an analog mantissa, and having an output for providing selected ones of said plurality of floating-point numbers in response to said decoded register numbers; and
    a hybrid arithmetic operation circuit coupled to said scheduler and to said hybrid register file, for performing a hybrid arithmetic operation between two floating-point numbers selected by said scheduler and providing a hybrid result represented by a result digital sign bit, a result digital exponent, and a result analog mantissa.

2. The hybrid floating-point arithmetic processor of claim 1, wherein said hybrid register file comprises:
    a digital register file comprising a plurality of entries each storing a respective digital sign bit and a respective digital exponent; and
    an analog register file comprising a plurality of entries each storing a respective analog mantissa,
    wherein said hybrid register file selects a first digital sign bit and a first digital exponent from said digital register file and a corresponding first analog mantissa from said analog register file in response to receiving a decoded register number from said scheduler.

3. The hybrid floating-point arithmetic processor of claim 2, wherein said hybrid register file comprises a charge coupled device, and each of said plurality of entries of said analog register file stores a respective analog mantissa as a charge packet.

4. The hybrid floating-point arithmetic processor of claim 1, wherein said hybrid register file comprises:
    a plurality of entries each storing a respective digital sign bit, a respective digital exponent, and a respective digital mantissa that represents a corresponding analog mantissa;
    an output selector for selecting an entry of said plurality of entries in response to receiving said decoded register numbers from said scheduler; and
    a digital-to-analog converter coupled to said output selector for converting said respective digital mantissa to said analog mantissa.

5. The hybrid floating-point arithmetic processor of claim 4, wherein said hybrid register file further comprises:
    an analog-to-digital converter having an input coupled to said output of said hybrid arithmetic operation circuit, and an output for providing said respective digital mantissa; and
    an input selector for selecting an entry of said plurality of entries in response to receiving a decoded register number from said scheduler and storing said result digital sign bit, said result digital exponent, and said result analog mantissa in a location of said hybrid register file indicated by said decoded register number.

6. The hybrid floating-point arithmetic processor of claim 4, wherein said hybrid register file stores said digital sign bit, said digital exponent, and said respective digital mantissa in a format compliant with the IEEE 754-2008 standard.

7. The hybrid floating-point arithmetic processor of claim 1, wherein arithmetic operation circuit comprises a hybrid adder comprising:
    a sign logic circuit for providing said result digital sign bit according to said digital sign bits of first and second operands and an operation control signal in response to said digital sign bit of each of said first and second operands;
    an exponent logic circuit for providing said result digital exponent according to said digital exponent of each of first and second operands, and providing a scale signal corresponding to a smallest one of said first and second operands in response to a difference in said digital exponent of each of said first and second operands; and
    an analog adder for scaling said smallest one of said first and second operands according to said scale signal, and for performing an addition or subtraction operation between said analog mantissa of said first and second operands in response to said operation control signal.

8. The hybrid floating-point arithmetic processor of claim 7, wherein said analog adder further comprises:
    a first digital-to-analog converter having an input coupled to said exponent logic circuit, and an output for providing a first analog scale signal;
    a second digital-to-analog converter having an input coupled to said exponent logic circuit, and an output for providing a second analog scale signal;
    a first analog multiplier having a first input for receiving said analog mantissa of said first operand, a second input for receiving a first analog scale signal, and an output;
    a second analog multiplier having a first input for receiving said analog mantissa of said second operand, a second input for receiving a second analog scale signal, and an output; and
    an analog adder having a first input coupled to said output of said first analog multiplier, a second input coupled to said output of said second analog multiplier, a control input for receiving said operation control signal, and an output for providing said result analog mantissa.

9. The hybrid floating-point arithmetic processor of claim 1, wherein said hybrid arithmetic operation circuit comprises a hybrid multiplier comprising:
- a sign and exponent logic circuit for providing said result digital sign bit according to said digital sign bit of each of first and second operands and said result digital exponent according to said digital exponent of each of said first and second operands and a normalize signal;
- a first analog multiplier having a first input for receiving said analog mantissa of said first operand, a second input for receiving said analog mantissa of said first operand, and an output for providing a product of said first and second inputs;
- a normalizer circuit having an input coupled to said output of said first analog multiplier, a first output for providing said normalize signal, and a second output for providing a normalize voltage; and
- a second analog multiplier having a first input coupled to said output of said first analog multiplier, a second input for receiving said normalize voltage, and an output for providing a product of said first and second inputs.

10. A hybrid floating-point arithmetic processor comprising a hybrid arithmetic operation circuit, said hybrid arithmetic operation circuit comprising:
- a digital sign and exponent logic circuit having a first input for receiving a first digital sign bit of a first operand, a second input for receiving a second digital sign bit of a second operand, a third input for receiving a first digital exponent of said first operand, a fourth input for receiving a second digital exponent of a second operand, a first output for providing a result digital sign bit, and a second output for providing a result digital exponent; and
- an analog mantissa circuit having a first input for receiving a first analog mantissa of said first operand, a second input for receiving a second analog mantissa of said second operand, and an output for providing a result analog mantissa, wherein said analog mantissa circuit performs a predetermined arithmetic operation between said first and second analog mantissas.

11. The hybrid floating-point arithmetic processor of claim 10, wherein said hybrid arithmetic operation circuit comprises a hybrid adder comprising:
- a sign logic circuit for providing said result digital sign bit and an operation control signal according to said first and second digital sign bits;
- an exponent logic circuit for providing said result digital exponent according to said first digital exponent and said second digital exponent, and providing a scale signal corresponding to a smallest one of said first and second operands in response to a difference between said first digital exponent and said second digital exponent; and
- an analog adder for scaling said smallest one of said first and second operands according to said scale signal, and for performing an addition or subtraction operation between said said first analog mantissa and said second analog mantissa in response to said operation control signal.

12. The hybrid floating-point arithmetic processor of claim 11, wherein said analog adder further comprises:
- a first digital-to-analog converter having an input coupled to said exponent logic circuit, and an output for providing a first analog scale signal;
- a second digital-to-analog converter having an input coupled to said exponent logic circuit, and an output for providing a second analog scale signal;
- a first analog multiplier having a first input for receiving said first analog mantissa, a second input for receiving a first analog scale signal, and an output;
- a second analog multiplier having a first input for receiving said second analog mantissa, a second input for receiving a second analog scale signal, and an output; and
- an analog adder having a first input coupled to said output of said first analog multiplier, a second input coupled to said output of said second analog multiplier, a control input for receiving said operation control signal, and an output for providing said result analog mantissa.

13. The hybrid floating-point arithmetic processor of claim 10, wherein said hybrid arithmetic operation circuit comprises a hybrid multiplier comprising:
- a sign and exponent logic circuit for providing said result digital sign bit according to said digital sign bit of each of first and second operands and said result digital exponent according to said first and second digital exponents and a normalize signal;
- a first analog multiplier having a first input for receiving said first analog mantissa, a second input for receiving said second analog mantissa, and an output for providing a product of said first and second inputs;
- a normalizer circuit having an input coupled to said output of said first analog multiplier, a first output for providing said normalize signal, and a second output for providing a normalize voltage; and
- a second analog multiplier having a first input coupled to said output of said first analog multiplier, a second input for receiving said normalize voltage, and an output for providing a product of said first and second inputs.

14. A method comprising:
- receiving a floating point instruction;
- decoding said floating point instruction to provide first and second decoded register numbers;
- fetching a first hybrid operand from a hybrid register file in response to said first decoded register number, wherein said first hybrid operand comprises a first digital portion and a first analog portion;
- fetching a second hybrid operand from said hybrid register file in response to said second decoded register number, wherein said second hybrid operand comprises a second digital portion and a second analog portion;
- performing a hybrid arithmetic operation on said first and second hybrid operands in a hybrid arithmetic operation circuit to provide a hybrid result; and
- storing said hybrid result in said hybrid register file.

15. The method of claim 14 wherein:
- said fetching said first hybrid operand comprises fetching a first digital sign bit, a first digital exponent, and a first analog mantissa; and
- said fetching said second hybrid operand comprises fetching a second digital sign bit, a second digital exponent, and a second analog mantissa.

16. The method of claim 14 wherein:
- said performing said hybrid arithmetic operation comprises performing a floating-point addition operation on said first and second hybrid operands in said hybrid arithmetic operation circuit to provide said hybrid result.

17. The method of claim 14 wherein:
- said performing said hybrid arithmetic operation comprises performing a floating-point multiplication operation on said first and second hybrid operands in said hybrid arithmetic operation circuit to provide said hybrid result.

18. The method of claim 14 further comprising:
- storing a plurality of operands in said hybrid register file, wherein each entry of said hybrid register file stores a respective digital sign bit, a respective digital exponent, and a respective analog mantissa.

19. The method of claim 18, wherein said storing further comprises:
- storing said respective digital sign bit and said respective digital exponent in a digital register file, and storing said respective analog mantissa in an analog register file.

20. The method of claim 19, wherein said storing said respective analog mantissa in an analog register file comprises:
- storing said respective analog mantissa as a charge packet in a charge coupled device.

\* \* \* \* \*